(12) United States Patent
Fritz et al.

(10) Patent No.: US 10,907,966 B2
(45) Date of Patent: Feb. 2, 2021

(54) SOLID STATE RING LASER GYROSCOPE HAVING A PRIMARY CAVITY AND A PUMPING CAVITY

(71) Applicant: Honeywell International Inc., Morris Plains, NJ (US)

(72) Inventors: Bernard Fritz, Eagan, MN (US); Alan Bruce Touchberry, Saint Louis Park, MN (US); Teresa Marta, White Bear Lake, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/444,038

(22) Filed: Jun. 18, 2019

(65) Prior Publication Data

US 2020/0400435 A1   Dec. 24, 2020

(51) Int. Cl.
| | |
|---|---|
| *G01C 19/66* | (2006.01) |
| *H01S 3/083* | (2006.01) |
| *H01S 3/091* | (2006.01) |
| *H01S 3/081* | (2006.01) |
| *H01S 3/16* | (2006.01) |

(52) U.S. Cl.
CPC ............ *G01C 19/661* (2013.01); *H01S 3/083* (2013.01); *H01S 3/0813* (2013.01); *H01S 3/091* (2013.01); *H01S 3/1603* (2013.01)

(58) Field of Classification Search
CPC .................. G01C 19/66; G01C 19/661; G01C 19/72–19/728; G01C 19/665; H01S 3/1603; H01S 3/083; H01S 3/091; H01S 3/0813; H01S 3/163; H01S 3/1611; H01S 3/1613; H01S 3/1655; H01S 3/161; H01S 3/1606; H01S 3/1605; H01S 3/1618;
(Continued)

(56) References Cited

U.S. PATENT DOCUMENTS

| 4,222,668 A | 9/1980 | Henry |
| 4,525,843 A * | 6/1985 | Diels ..................... H01S 3/083 356/459 |

(Continued)

FOREIGN PATENT DOCUMENTS

EP   3021080 B1   2/2017

OTHER PUBLICATIONS

European Patent Office, "Extended European Search Report from EP Application No. 20180111.5", from Foreign Counterpart to U.S. Appl. No. 16/444,038, Nov. 24, 2020, pp. 1 through 5, Published: EP.

*Primary Examiner* — Michael P LaPage
(74) *Attorney, Agent, or Firm* — Fogg & Powers LLC

(57) ABSTRACT

A ring laser gyroscope is provided. A light source is configured to generate light of a first wavelength. A plurality primary cavity mirrors are configured to route light of a second wavelength around a primary cavity to a readout device. One primary cavity mirror of the plurality of primary cavity mirrors includes a gain medium. The pumping mirror and the one primary cavity mirror including the gain medium is positioned and configured to reflect the light of the first wavelength back and forth in a pumping cavity through the gain medium, wherein the light of the first wavelength stimulates the gain medium to generate the light of the second wavelength that are reflected around the primary cavity to the readout device.

20 Claims, 3 Drawing Sheets

(58) Field of Classification Search
CPC .... H01S 3/1615; H01S 3/1616; H01S 3/1608; H01S 3/1636
See application file for complete search history.

(56) References Cited

U.S. PATENT DOCUMENTS

| | | | |
|---|---|---|---|
| 4,647,204 A * | 3/1987 | Honeycutt | G01C 19/66 356/459 |
| 5,363,192 A | 11/1994 | Diels et al. | |
| 5,408,492 A | 4/1995 | Vossler et al. | |
| 2016/0138922 A1 * | 5/2016 | Anderson | G01C 19/665 356/472 |
| 2016/0238392 A1 * | 8/2016 | Wen | H01S 3/082 |
| 2017/0373458 A1 | 12/2017 | Podgorski | |
| 2020/0056889 A1 * | 2/2020 | Touchberry | H01S 3/083 |

* cited by examiner

SOLID STATE RING LASER GYROSCOPE HAVING A PRIMARY CAVITY AND A PUMPING CAVITY

BACKGROUND

Ring Laser Gyroscopes (RLGs) are used in the inertial navigation field to measure angular motion or rotation. Traditionally, RLGs utilize a low pressure Helium-Neon gas discharge for an active gain medium. Although the existing Helium-Neon gas discharge RLGs have performed suitably in the inertial navigation and other measurement fields, these Helium-Neon gas discharge RLGs can have lifetime limitations and are expensive to manufacture.

RLG utilizing a solid-state gain medium instead of a Helium-Neon gas mixture is currently being looked at as a viable option. From a manufacturing standpoint, a solid-state gain medium RLG can provide significant savings over Helium-Neon gas discharge RLGs in terms of labor and fabrication costs. Also, this solid-state gain medium RLG may provide technical advantages over Helium-Neon gas discharge RLGs in terms of increased longevity.

An example of a solid-state gain medium used for the cavity gain for the solid-state RLG is a layer of Neodymium-doped silica (Nd-doped $SiO_2$). This layer of Nd-doped silica may be deposited onto the top layer or may be incorporated within the layers of a highly reflective, multilayer dielectric mirror in the cavity of the RLG.

SUMMARY

The following summary is made by way of example and not by way of limitation. It is merely provided to aid the reader in understanding some of the aspects of the subject matter described. Embodiments provide an RLG that implements a pumping cavity in an efficient, effective and compact configuration.

In one embodiment, a ring laser gyroscope including a light source, a plurality of primary cavity mirrors and a pumping mirror is provided. The light source is configured to generate light of a first wavelength. The plurality primary cavity mirrors are configured to route light of a second wavelength around a primary cavity to a readout device. One primary cavity mirror of the plurality of primary cavity mirrors includes a gain medium. The pumping mirror and the one primary cavity mirror including the gain medium is positioned and configured to reflect the light of the first wavelength back and forth in a pumping cavity through the gain medium, wherein the light of the first wavelength stimulates the gain medium to generate the light of the second wavelength that are reflected around the primary cavity to the readout device.

In another example embodiment, an enhanced optical solid state optical pumping system is provided. The system includes a light source, a plurality of primary cavity mirrors and a pumping mirror. The light source is configured to generate light of a first wavelength. The plurality of primary cavity mirrors are configured to route light of a second wavelength through a primary cavity. One primary cavity mirror of the plurality of mirrors includes a gain medium, a first portion and a second portion. The first portion is configured to reflect the light of the first wavelength. The second portion is configured to reflect the light of the second wavelength. The pumping mirror and the one primary cavity mirror including the gain medium are positioned and configured to reflect the light of the first wavelength back and forth in a pumping cavity, wherein the light of the first wavelength stimulate the gain medium to generate the light of the second wavelength that are routed through the primary cavity.

In yet another embodiment, a method of operating a laser ring gyroscope is provided. The method includes directing light of a first wavelength into a pumping cavity that includes at pumping mirror and first primary mirror, wherein the pumping mirror and the first primary mirror are configured and positioned to reflect the light of the first wavelength back and forth; stimulating a gain medium associated with the first primary mirror with the light of the first wavelength to generate light of a second wavelength; directing the generated light of the second wavelength around a primary cavity in opposite directions with at least the first primary mirror; reading at least portions of the light of the second wavelength passing through a measurement mirror in the primary cavity; and determining rotation based on the reading of the light of the second wavelengths.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a laser assembly with enhanced optical pumping that includes a pumping cavity formed in part with a mirror used for a primary cavity. Hence embodiments include a primary cavity and a pumping cavity. Further, embodiments employ a thin layer of gain medium that is deposited on the shared mirror that is used to form the pumping cavity. In at least one embodiment, the pumping cavity is located within an outline of the primary cavity to reduce the overall size of the system. If the pumping cavity (or gain cavity) is in resonance, the pumping cavity generates intra-cavity, power at the gain medium at much greater than an originating pump laser power is achieved.

Figure 1:
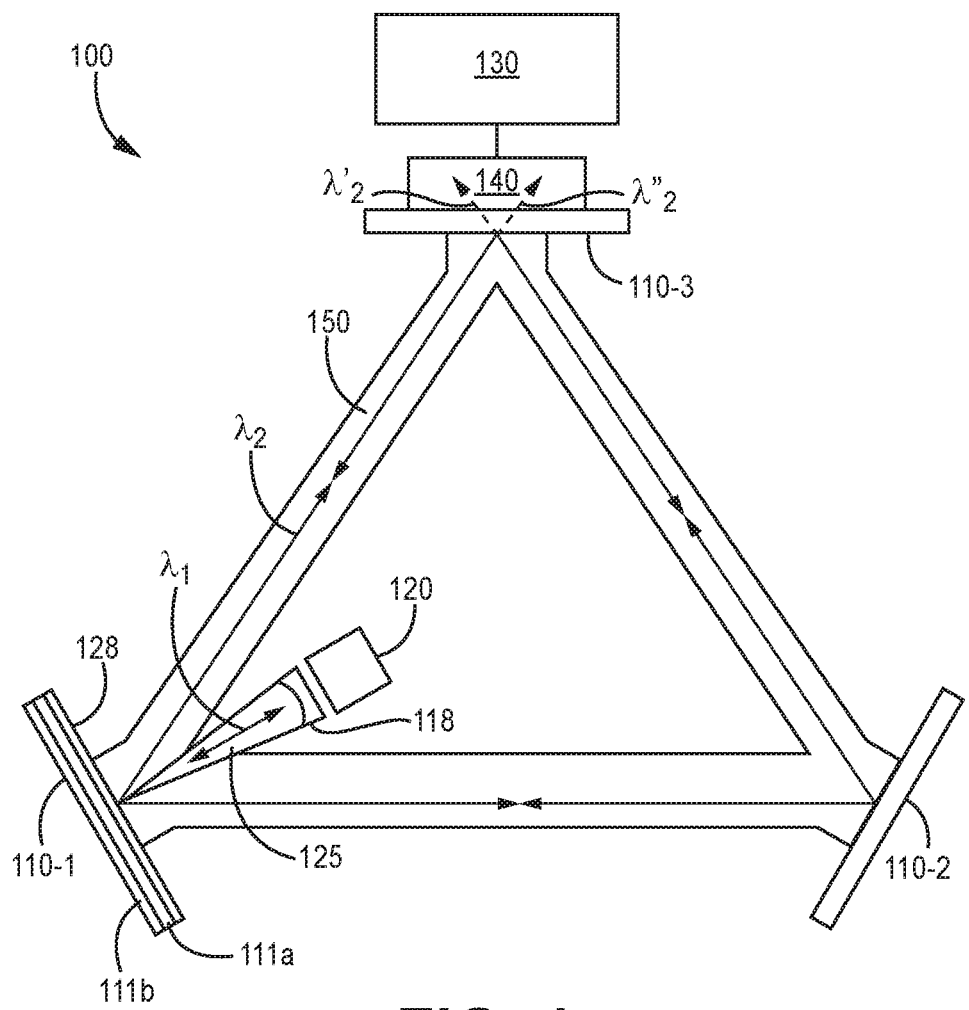
FIG. 1 is an illustration of the ring laser gyroscope according to one exemplary embodiment.

FIG. 1 illustrates an example of a ring laser gyroscope (RLG) 100 of one embodiment. The gyroscope 100 is a solid-state ring laser gyroscope that includes a pumping cavity that passes light of a first wavelength $\lambda_1$ through a gain medium to stimulate atoms in the gain medium into an excited state to generate light of a second wavelength $\lambda_2$ that is passed through a primary cavity. RLG 100 of FIG. 1 includes three primary cavity mirrors 110-1, 110-2 and 110-3 that reflect light of a second wavelength $\lambda_2$ around a primary cavity 150 in a closed loop pathway. The closed pathway is illustrated as being substantially triangle in this example with the primary cavity mirrors 110-1, 110-2 and 110-3 positioned at the respective corners. This configuration is a non-limiting example. In other examples, other shapes of closed pathway may be formed with any number of mirrors needed to direct light though the primary (or main) cavity.

The primary cavity mirrors 100-1, 110-2 and 110-3 in one embodiment are highly reflective multilayer mirrors positioned to reflect light having the second wavelength $\lambda_2$ to the third mirror 110-3 (measurement mirror) where at least portions of counter propagating light of the second wavelengths $\lambda_2'$ and $\lambda_2''$ passing through the measurement mirror 110-3 are read by a readout device 140. As discussed below, in a RLG embodiment, the light of the second wavelength $\lambda_2$ are reflected around the primary cavity 150 in opposite directions via the mirrors 110-1 through 110-3. The readout device 140 may include one or more photodetectors that are in optical communication with the closed loop pathway of the primary cavity though mirror 110-3. The readout device 140 is communicatively coupled to a processing unit 130 that processes the signals to measure angular motion or rotation.

In embodiments, a pumping cavity 125 and gain medium 128 that is incorporated with a mirror, such as primary cavity mirror 110-1, is used to create an RLG 100. A light source 120 (which may be a laser source in some embodiments) generates light at a first wavelength $\lambda_1$. In one embodiment, the fourth mirror 118 (pumping mirror) partially reflective to allow the light of the first wavelength $\lambda_1$ to pass through a fourth mirror 118 (pumping mirror) into the pumping cavity 125. In this embodiment, the pumping cavity 125 is set up as a "resonant cavity with pathway control. In another embodiment, the light source 120 is positioned to provide the light of the first wavelength $\lambda_1$ in an off-axis orientation onto the fourth mirror 118 with coating 111$a$ of mirror 110-1 reflecting the light of the first wavelength $\lambda_1$ from the light source 120 to mirror 118 to ensure multiple passes. Further in another embodiment, an aperture in at least a coating or through the fourth mirror 118 provides the path to launch the light of the first wavelength $\lambda_1$ into the pumping cavity 125. The pumping cavity 125 in this embodiment is located within an inner boundary of the primary cavity 150 that includes the shared mirror 110-1. The location of the pumping cavity 125 and fourth mirror 118 and laser source 120 with the inner boundary of the primary cavity 150 allows for the RLG 100 to have a compact overall size. Moreover, the use of the primary cavity mirror 110-1 reduces the number of mirrors needed for the RLG 100 with a pumping cavity 125.

The gain medium 128 comprises a rare-earth doped gain medium. In one example embodiment, the gain medium 128 is few wavelengths thick. In other embodiments the layer may be thicker. In one embodiment, the gain medium may be formed with a thin, amorphous film of rare-earth doped glassy material. Further, the layer of gain medium 128 may include a plurality of layers or sub-layers of gain medium 128 of a desired property. In some embodiments, the gain medium 128 is formed on the mirror via deposition. Further in an embodiment the gain medium 128 incorporated by laminating process. Further still in some embodiments the gain medium 128 is formed within the mirror 110-1. Hence, embodiments are not limited to a specific location or type of formation of the gain medium 128 that is incorporated with the mirror 110-1.

The shared mirror 110-1 in the example embodiment is illustrated as including a first portion 111$a$ and a second portion 111$b$. The first and second portions 111$a$ and 111$b$ may be made of a plurality of layers. The first portion 111$a$ is designed to reflect one of the light of the first wavelength $\lambda_1$ or the second wavelength $\lambda_2$ while the second portion 111$b$ is designed to reflect the other of the light of the first wavelength $\lambda_1$ or the second wavelength $\lambda_2$. For example, the first portion 111$a$ of the mirror 110-1 may be designed to reflect the light of the first wavelength $\lambda_1$ while the second portion 111$b$ of the mirror 110-1 is designed to reflect the light of the second wavelength $\lambda_2$.

The light of the first wave length $\lambda_1$ within the pumping cavity 125 is reflected back and forth between the first portion 111$a$ of the mirror 110-1 and the fourth mirror 118. This pumping of the light back and forth provides a greater chance that the light of the first wave length $\lambda_1$ will stimulate ions in the solid state gain medium 128 into excited states that generate the light (laser beam) of the second wave length which travels around the primary cavity 150 via the mirrors 110-1 through 110-3. The generated light of the second wavelength $\lambda_2$ travels in both directions around the primary cavity 150 with, as discussed above, at least portions of counter propagating light of the second wavelengths $\lambda_2'$ and $\lambda_2''$ passing through the measurement mirror 110-3 where it is read by the readout device 140.

Hence, mirror 110-1 in embodiments is being used in two different cavities, the primary cavity 150 and the pumping cavity 125. One of the benefits of using this configuration with a pumping cavity 125 is that less optical power is needed from the light source 120 because the highly reflective mirrors 118 and 110-1 at the first wavelength $\lambda_1$ create a reflective cavity that confines the beam within the cavity 125 enabling multiple reflections. This is configuration is more efficient at stimulating ions in the solid state gain medium 128. For example, the power of the light source 120 may be reduced by a factor of ten with the use of the pumping cavity configuration of embodiments.

An example of a suitable gain medium 128 dopant is neodymium. Other suitable rare-earth dopants that can be used to form the gain medium includes, but is not limited to, cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Non-limiting examples of glassy host materials than can be used to form gain layer 230 include silica, titania, tantalum oxide ($Ta_2O_5$), alumina ($Al_2O_3$), zirconia ($ZrO_2$), silicate glasses, phosphate glasses, fluorosilicate glasses, non-oxide glasses such as fluoride glasses, or the like. Other glassy host materials that are suitable for ion beam sputter deposition can also be employed.

Figure 2:
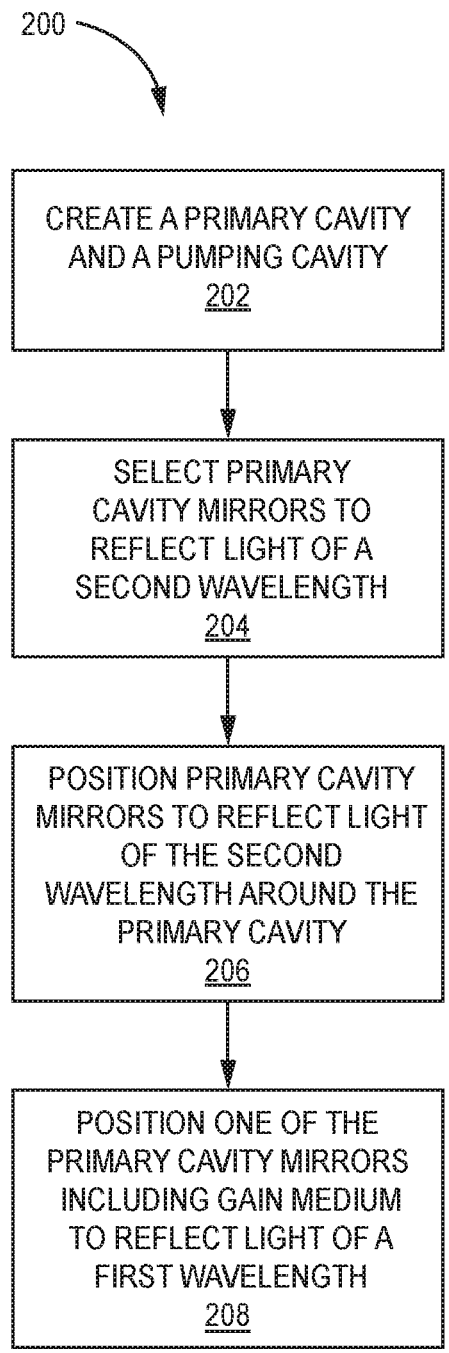
FIG. 2 is a ring laser gyroscope formation flow diagram according to one exemplary embodiment.

FIG. 2 illustrates a RLG formation flow diagram 200 of one example embodiment. The RLG formation flow diagram 200 is provided in sequential blocks. Other embodiments may include additional blocks and block different sequential order. Hence, embodiments are not limited to block and the sequence of the blocks provided in FIG. 2.

The RLG formation flow diagram 200 starts a block (202) forming a primary cavity 150 and a pumping cavity 125 for the RLG 100. As discussed above, the pumping cavity 125 in an embodiment, is positioned within (or within an outline of) the primary cavity 150. Mirrors to be used in the primary cavity 150 are selected at block (204). The primary cavity mirrors (generally identified as 110) are selected to reflect light of the second wavelength $\lambda_2$ around the primary cavity 150. In some embodiments, the number of primary cavity mirrors 110 used is three or greater. The primary cavity mirrors 110 are positioned at block (206) to direct the light of the second wavelength $\lambda_2$ around the primary cavity 150. The one primary cavity mirror 100-1 is further positioned and configured to create the pumping cavity 125 with the pumping mirror 118 at block (208).

As discussed above, primary cavity mirror 110-1 in the example of FIG. 1, includes the gain medium 128. The gain medium 128 is selected so that the light of the first wavelength $\lambda_1$ stimulates atoms of gain medium 128 to generate (emit) photons of the second wavelength $\lambda_2$ that are directed around the primary cavity 150 in opposite directions. In particular, the light of the first wavelength generated by the light source 120, excites (or pumps) the atoms in the gain medium 128 (through absorption) form a lower energy state to an excited energy state. The excited atoms emit photons (of the second wavelength $\lambda_2$) when they return to their normal or ground state. The primary cavity mirrors 110 direct the photons of the second wavelength $\lambda_2$ to bounce around the path (a ring configuration in the example embodiment) in the primary cavity 150. As the photons of the second wavelength $\lambda_2$ continuously pass through the pumped gain media 128, as they bounce around the primary cavity 150, amplification is created by Stimulated Emission of Radiation (LASER) which generates a laser beam. The photons of the laser beam are of a single wavelength $\lambda_2$ (monochromic) and travel in phase with one another. The reflecting back and forth of the pump light of the first wavelength $\lambda_1$ through the gain medium helps to excite more atoms and emit more photons (of the second wavelength $\lambda_2$) that are directed around the primary cavity 150 (LASER cavity) to create the LASER beam.

Figure 3:
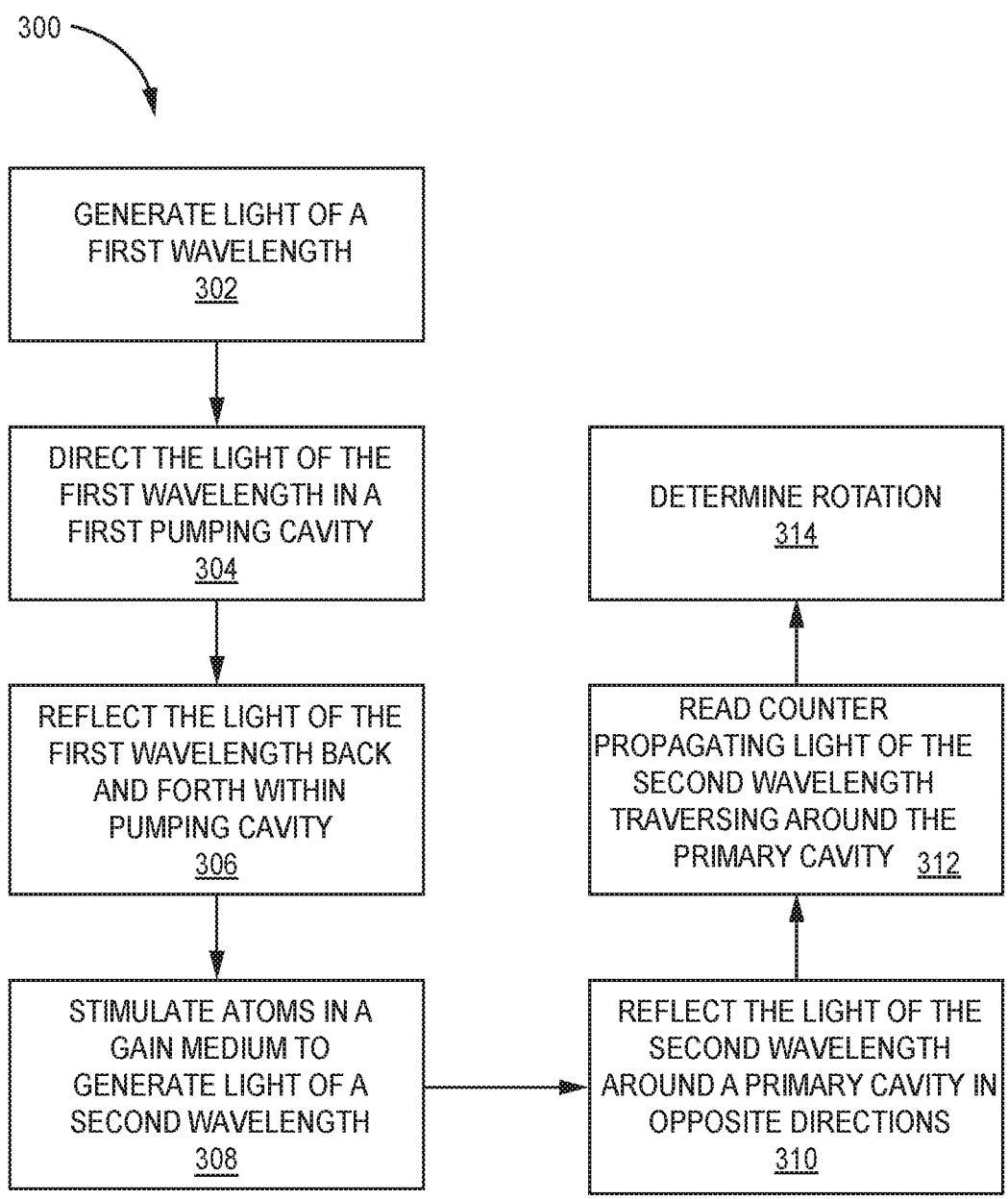
FIG. 3 is a ring laser gyroscope operation flow diagram according to one exemplary embodiment.

Referring to FIG. 3, a RLG operation flow diagram of one embodiment is illustrated. The RLG operation flow diagram 300 is provided in sequential blocks. Other embodiments may include additional blocks and block different sequential order. Hence, embodiments are not limited to block and the sequence of the blocks provided in FIG. 3.

The RLG operation flow diagram starts a block (302) by generating light (laser beam) of a first wavelength $\lambda_1$. The light of the first wavelength $\lambda_1$ is directed into pumping cavity 125 at block (304). Once in the pumping cavity 125, the light of the first wavelength $\lambda_1$ reflect back and forth between the pumping mirror 118 and the first portion 111a of the mirror 110-1 (306). The light of the first wavelength $\lambda_1$ stimulates atoms in the gain medium of mirror 110-1 as it is reflected back and forth in the in the pumping cavity 125. The stimulated atoms in the gain medium generate (emit) light of a second wavelength $\lambda_2$ indicated at block (308). The second portion 111b of the mirror 110-1 reflects and directs the generated light of a second wavelength $\lambda_2$ (photons) around the primary cavity 150 in opposite directions at block (310). As discussed above, the light of the second wavelength $\lambda_2$ (photons of the second wavelength $\lambda_2$) create a laser beam of light of the second wavelength $\lambda_2$ in the primary cavity 150. At least portions of counter propagating light of the second wavelengths $\lambda_2'$ and $\lambda_2''$ passing through the measurement mirror 110-3 are read by the readout device 140 at step (312). From the readout, the processing unit 130 determines angular motion or rotation at step (314).

Although, embodiments above are described as being applicable to RLG, any type of device needing an efficient system of generating a laser signal of a specific wavelength using a low power laser beam generating source may implement a pumping cavity as described above.

Example Embodiments

Example 1 includes a ring laser gyroscope including a light source, a plurality of primary cavity mirrors and a pumping mirror. The light source is configured to generate light of a first wavelength. The plurality primary cavity mirrors are configured to route light of a second wavelength around a primary cavity to a readout device. One primary cavity mirror of the plurality of primary cavity mirrors includes a gain medium. The pumping mirror and the one primary cavity mirror including the gain medium is positioned and configured to reflect the light of the first wavelength back and forth in a pumping cavity through the gain medium, wherein the light of the first wavelength stimulates the gain medium to generate the light of the second wavelength that are reflected around the primary cavity to the readout device.

Example 2, includes the ring laser gyroscope of Example 1, wherein the pumping cavity is located within an outline of the primary cavity.

Example 3, includes the ring laser gyroscope of any of the Examples 1-2, wherein the gain medium includes neodymium.

Example 4, includes the ring laser gyroscope of any of the Examples 1-2, wherein the gain medium includes dopants of at least one of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Example 5, includes the ring laser gyroscope of any Examples 1-4, wherein the gain medium includes a layer of gain medium with a glassy host material.

Example 6, includes the ring laser gyroscope of Example 5, wherein the glassy host material includes at least one of silica, titania, tantalum oxide ($Ta_2O_5$), alumina ($Al_2O_3$), zirconia ($ZrO_2$), silicate glasses, phosphate glasses, fluorosilicate glasses and non-oxide glasses such as fluoride glasses.

Example 7, includes the ring laser gyroscope of any Examples 1-6, wherein the number of primary cavity mirrors is at least three.

Example 8, includes the ring laser gyroscope of any Examples 1-7, wherein the gain medium is a layer of rare-earth doped gain medium that is at least two wavelengths thick.

Example 9, includes the ring laser gyroscope of any Examples 1-8, wherein the one primary cavity mirror of the plurality of primary cavity mirrors including a gain medium further includes a first portion and a second portion. The first portion is configured to reflect the light of the first wavelength and the second portion is configured to reflect light of the second wavelength.

Example 10, includes the ring laser gyroscope of any Examples 1-9, wherein the plurality primary cavity mirrors include a measurement mirror that is configured to allow at least portions of the light of the second wavelength to pass through to the readout device.

Example 11, includes the ring laser gyroscope of any Examples 1-10, further comprising a processing unit communicatively coupled to the readout device, the processing unit configured to determine angular motion based on an output of the readout device.

Example 12 includes an enhanced optical solid state optical pumping system. The system includes a light source, a plurality of primary cavity mirrors and a pumping mirror. The light source is configured to generate light of a first wavelength. The plurality of primary cavity mirrors are configured to route light of a second wavelength through a primary cavity. One primary cavity mirror of the plurality of mirrors includes a gain medium, a first portion and a second portion. The first portion is configured to reflect the light of the first wavelength. The second portion is configured to reflect the light of the second wavelength. The pumping mirror and the one primary cavity mirror including the gain medium are positioned and configured to reflect the light of the first wavelength back and forth in a pumping cavity, wherein the light of the first wavelength stimulate the gain medium to generate the light of the second wavelength that are routed through the primary cavity.

Example 13 includes the system of Example 12, wherein the pumping cavity is located within an outline of the primary cavity.

Example 14 includes the system of any of the Exampled 12-13, wherein the gain medium is a layer of rare-earth doped gain medium that is at least two wavelengths thick.

Example 15 includes the system of any of the Exampled 12-14, wherein the gain medium includes dopants of at least one of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Example 16 includes the system of any of the Example 12-16, wherein the gain medium includes at least one glassy host material that includes at least one of silica, titania, tantalum oxide ($Ta_2O_5$), alumina ($Al_2O_3$), zirconia ($ZrO_2$), silicate glasses, phosphate glasses, fluorosilicate glasses and non-oxide glasses such as fluoride glasses.

Example 17 includes a method of operating a laser ring gyroscope. The method includes directing light of a first wavelength into a pumping cavity that includes at pumping mirror and first primary mirror, wherein the pumping mirror and the first primary mirror are configured and positioned to reflect light of the first wavelength back and forth; stimulating a gain medium associated with the first primary mirror with the light of the first wavelength to generate light of a second wavelength; directing the generated light of the second wavelength around a primary cavity in opposite directions with at least the first primary mirror; reading at least portions of the light of the second wavelength passing through a measurement mirror in the primary cavity; and determining rotation based on the reading of the light of the second wavelengths.

Example 18 includes the method of Example 17, wherein the pumping cavity is positioned within an outline of the primary cavity.

Example 19 includes the method of any of the Examples 17-18, wherein the generated light of the second wavelength around a primary cavity in opposite directions with at least the first primary mirror further includes reflecting the light of the second wavelength off of a first portion of the first primary mirror configured to reflect the light of the second wavelength.

Example 20 includes the method of any of the Examples 17-19, wherein directing the light of the first wavelength into the pumping cavity further including directing the light of the first wavelength through the pumping mirror.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A ring laser gyroscope comprising:
   a light source configured to generate light of a first wavelength;
   a plurality primary cavity mirrors configured to route light of a second wavelength around a primary cavity to a readout device, one primary cavity mirror of the plurality of primary cavity mirrors including a gain medium; and
   a pumping mirror, the pumping mirror and the one primary cavity mirror including the gain medium positioned and configured to reflect the light of the first wavelength back and forth in a pumping cavity through the gain medium, wherein the light of the first wavelength stimulates the gain medium to generate the light of the second wavelength that are reflected around the primary cavity to the readout device.

2. The ring laser gyroscope of claim 1, wherein the pumping cavity is located within an outline of the primary cavity defined by a closed loop pathway for the light of the second wavelength reflected around the primary cavity.

3. The ring laser gyroscope of claim 1, wherein the gain medium includes neodymium.

4. The ring laser gyroscope of claim 1, wherein the gain medium includes dopants of at least one of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

5. The ring laser gyroscope of claim 1, wherein the gain medium includes a layer of gain medium with a glassy host material.

6. The ring laser gyroscope of claim 5, wherein the glassy host material includes at least one of silica, titania, tantalum oxide ($Ta_2O_5$), alumina ($Al_2O_3$), zirconia ($ZrO_2$), silicate glasses, phosphate glasses, fluorosilicate glasses and non-oxide glasses such as fluoride glasses.

7. The ring laser gyroscope of claim 1, wherein a number of primary cavity mirrors is at least three.

8. The ring laser gyroscope of claim 1, wherein the gain medium is a layer of rare-earth doped gain medium that is at least two wavelengths thick.

9. The ring laser gyroscope of claim 1, wherein the one primary cavity mirror of the plurality of primary cavity mirrors including the gain medium further comprises:
   a first portion configured to reflect the light of the first wavelength; and
   a second portion configured to reflect the light of the second wavelength.

10. The ring laser gyroscope of claim 1, wherein the plurality primary cavity mirrors include a measurement mirror that is configured to allow at least portions of the light of the second wavelength to pass through to the readout device.

11. The ring laser gyroscope of claim 1, further comprising a processing unit communicatively coupled to the readout device, the processing unit configured to determine angular motion based on an output of the readout device.

12. An enhanced optical solid state pumping system, the system comprising:

a light source configured to generate light of a first wavelength;

a plurality of primary cavity mirrors configured to route light of a second wavelength through a primary cavity, one primary cavity mirror of the plurality of primary cavity mirrors including,
- a gain medium,
- a first portion configured to reflect the light of the first wavelength, and
- a second portion configured to reflect the light of the second wavelength; and a pumping mirror, the pumping mirror and the one primary cavity mirror including the gain medium being positioned and configured to reflect the light of the first wavelength back and forth in a pumping cavity, wherein the light of the first wavelength stimulate the gain medium to generate the light of the second wavelength that are routed through the primary cavity.

13. The system of claim 12, wherein the pumping cavity is located within an outline of the primary cavity defined by a closed loop pathway for the light of the second wavelength reflected around the primary cavity.

14. The system of claim 12, wherein the gain medium is a layer of rare-earth doped gain medium that is at least two wavelengths thick.

15. The system of claim 12, wherein the gain medium includes dopants of at least one of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

16. The system of claim 12, wherein the gain medium includes at least one glassy host material that includes at least one of silica, titania, tantalum oxide ($Ta_2O_5$), alumina ($Al_2O_3$), zirconia ($ZrO_2$), silicate glasses, phosphate glasses, fluorosilicate glasses and non-oxide glasses such as fluoride glasses.

17. A method of operating a laser ring gyroscope, the method comprising:
- directing light of a first wavelength into a pumping cavity that includes at pumping mirror and first primary mirror, wherein the pumping mirror and the first primary mirror are configured and positioned to reflect the light of the first wavelength back and forth;
- stimulating a gain medium associated with the first primary mirror with the light of the first wavelength to generate light of a second wavelength;
- directing the generated light of the second wavelength around a primary cavity in opposite directions with at least the first primary mirror;
- reading at least portions of the light of the second wavelength passing through a measurement mirror in the primary cavity; and
- determining rotation based on the read light of the second wavelengths.

18. The method of claim 17, wherein the pumping cavity is positioned within an outline of the primary cavity defined by a closed loop pathway for the light of the second wavelength reflected around the primary cavity.

19. The method of claim 17, wherein the generated light of the second wavelength around the primary cavity in opposite directions with at least the first primary mirror further comprises:
- reflecting the light of the second wavelength off of a first portion of the first primary mirror configured to reflect the light of the second wavelength.

20. The method of claim 17, wherein directing the light of the first wavelength into the pumping cavity further comprises:
- directing the light of the first wavelength through the pumping mirror.

* * * * *